US012131699B2

(12) United States Patent
Hong et al.

(10) Patent No.: US 12,131,699 B2
(45) Date of Patent: Oct. 29, 2024

(54) BRIGHTNESS ADJUSTING METHOD, DEVICE, AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Jitong Hong, Hubei (CN); Fulin Liu, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/758,136

(22) PCT Filed: May 31, 2022

(86) PCT No.: PCT/CN2022/096346
§ 371 (c)(1),
(2) Date: Jun. 29, 2022

(87) PCT Pub. No.: WO2023/206698
PCT Pub. Date: Nov. 2, 2023

(65) Prior Publication Data

US 2024/0194133 A1 Jun. 13, 2024

(30) Foreign Application Priority Data

Apr. 28, 2022 (CN) ......................... 202210469478.3

(51) Int. Cl.
*G09G 3/3233* (2016.01)

(52) U.S. Cl.
CPC ... *G09G 3/3233* (2013.01); *G09G 2320/0233* (2013.01); *G09G 2320/0626* (2013.01); *G09G 2320/0693* (2013.01)

(58) Field of Classification Search
CPC ......... G09G 2320/0693; G09G 3/3233; G09G 2320/0233; G09G 2320/0626
See application file for complete search history.

(56) References Cited

U.S. PATENT DOCUMENTS

2013/0321485 A1 12/2013 Eom et al.
2019/0005898 A1 * 1/2019 Albrecht .............. G09G 3/3426
(Continued)

FOREIGN PATENT DOCUMENTS

CN 101902861 A 12/2010
CN 106415377 A 2/2017
(Continued)

OTHER PUBLICATIONS

International Search Report in International application No. PCT/CN2022/096346,mailed on Nov. 30, 2022.
(Continued)

*Primary Examiner* — Muhammad N Edun
(74) *Attorney, Agent, or Firm* — PV IP PC; Wei Te Chung

(57) ABSTRACT

The present application relates to a brightness adjusting method, a device, a display device, and a storage medium. The method includes obtaining display brightness value lines, wherein each of the display brightness values of the display brightness value lines in a first display brightness value interval corresponds to a direct current (DC) mode; determining a target brightness adjusting mode according to a display brightness value interval in the display brightness value lines corresponding to an obtained target display brightness value; and adjusting brightness of a display
(Continued)

device according to the target brightness adjusting mode to mitigate issues of a worse display effect and color bias.

12 Claims, 5 Drawing Sheets

(56) References Cited

U.S. PATENT DOCUMENTS

2020/0234655 A1* 7/2020 Bian .................... G09G 3/2003
2022/0044643 A1* 2/2022 Gu ........................... G09G 3/32

FOREIGN PATENT DOCUMENTS

| | | | |
|---|---|---|---|
| CN | 110164366 | A | 8/2019 |
| CN | 110738960 | A | 1/2020 |
| CN | 111243523 | A | 6/2020 |
| CN | 113436567 | A | 9/2021 |
| CN | 113674691 | A | 11/2021 |
| JP | 2017129878 | A | 7/2017 |
| KR | 20190074847 | A | 6/2019 |

OTHER PUBLICATIONS

Written Opinion of the International Search Authority in International application No. PCT/CN2022/096346,mailed on Nov. 30, 2022.
Chinese Office Action issued in corresponding Chinese Patent Application No. 202210469478.3 dated Dec. 8, 2022, pp. 1-9.

* cited by examiner

BRIGHTNESS ADJUSTING METHOD, DEVICE, AND DISPLAY DEVICE

FIELD OF INVENTION

The present application relates to a field of display technologies, especially to a brightness adjusting method, a device, and a display device.

BACKGROUND OF INVENTION

A conventional liquid crystal display (LCD) adjusts brightness of a backlight by changing a current of the backlight, namely, direct current light adjustment, which is also called DC light adjustment. Each pixel of an organic LED (OLED) display panel is self-luminous, and display of each image requires simultaneously controlling a light emitting intensity of ten million of pixels. Each pixel is controlled by a larger number of thin film transistor (TFT) device. Such DC light adjusting method has better color uniformity of a screen under high brightness. However, under low brightness, a pixel of OLED driven by a small current highlights difference between TFTs of the same uniformity under a process, which results in a poor display effect and causes an issue of uneven brightness and uneven chroma. For solving the issue, the conventional OLED screen employs a method of DC light adjustment under high brightness and PWM light adjustment under low brightness. Such PWM light adjusting method has principles as shown in FIG. 1, which uses persistence of vision of human's eyes to control screen brightness by an alternate darkness-and-brightness method of "screen-on, screen-off, screen-on, screen-off".

SUMMARY OF INVENTION

Technical Issue

At present, a conventional switching method between pulse-width modulation (PWM) light adjusting and direct current (DC) light adjusting is as shown in FIG. 2. An abscissa of FIG. 2 is a display brightness value (DBV, and an ordinate of FIG. 2 is a chroma value. A line in FIG. 2 is a DBV line (display brightness value lines). A point A in FIG. 2 is a light adjusting division display brightness value (an abscissa of the point A shows DBV=327), values greater than the light adjusting division display brightness value is in a DC light adjusting region. Values below the light adjusting division display brightness value is in the PWM light adjusting mode. Namely, the light adjusting division display brightness value is the display brightness value (the light adjusting division display brightness value in FIG. 2 is 327) switching from the DC light adjusting mode to the PWM light adjusting mode. In FIG. 2, display linearity of the brightness lines on a left side of the point A is worse. Therefore, a display effect of the display screen in the region is worse and the display screen has an issue of color bias.

Technical Solution

An embodiment of the present application provides a touch display panel and a touch display device to mitigate a mura phenomenon occurring after a touch display panel undergoes a reliability test.

In a first aspect, the embodiment of the present application provides a brightness adjusting method, including:

obtaining display brightness value lines, wherein the display brightness value lines include a first display brightness value interval, each of display brightness values of the display brightness value lines in the first display brightness value interval corresponds to a direct current (DC) light adjusting mode; the first display brightness value interval is an interval including a first display brightness value and a second display brightness value, a difference between a duty ratio of the first display brightness value and a duty ratio of the second display brightness value is less than a predetermined difference value; wherein the first display brightness value is less than second display brightness value, the second display brightness value is less than a light adjusting division display brightness value, the light adjusting division display brightness value is a display brightness division value configured to switch the DC light adjusting mode and a pulse-width modulation (PWM) light adjusting mode; and the display brightness division value corresponds to a first gamma signal, the second display brightness value corresponds to a second gamma signal, and the first display brightness value corresponds to a third gamma signal;

determining a target brightness adjusting mode according to a display brightness value interval in the display brightness value lines corresponding to an obtained target display brightness value, wherein the target brightness adjusting mode is the DC light adjusting mode or the PWM light adjusting mode; and adjusting brightness of a display device according to the target brightness adjusting mode.

In a second aspect, the embodiment of the present application provides a brightness adjusting device, including:

an obtaining module configured to obtain display brightness value lines, wherein the display brightness value lines include a first display brightness value interval, each of display brightness values of the display brightness value lines in the first display brightness value interval corresponds to a direct current (DC) light adjusting mode; the first display brightness value interval is an interval including a first display brightness value and a second display brightness value, a difference between a duty ratio of the first display brightness value and a duty ratio of the second display brightness value is less than a predetermined difference value; wherein the first display brightness value is less than second display brightness value, the second display brightness value is less than a light adjusting division display brightness value, the light adjusting division display brightness value is a display brightness division value configured to switch the DC light adjusting mode and a pulse-width modulation (PWM) light adjusting mode; and the display brightness division value corresponds to a first gamma signal, the second display brightness value corresponds to a second gamma signal, and the first display brightness value corresponds to a third gamma signal;

a determination module configured to determine a target brightness adjusting mode according to a display brightness value interval in the display brightness value lines corresponding to an obtained target display brightness value, wherein the target brightness adjusting mode is the DC light adjusting mode or the PWM light adjusting mode; and an adjusting module configured to adjust brightness of the display device according to the target brightness adjusting mode.

In a third aspect, the embodiment of the present application provides a display device, the display device includes a control unit and a storage unit, the control unit is configured to implement instructions in the storage unit to implement a brightness adjusting method;

the brightness adjusting method includes:

obtaining display brightness value lines, wherein the display brightness value lines include a first display brightness value interval, each of display brightness values of the display brightness value lines in the first display brightness value interval corresponds to a direct current (DC) light adjusting mode; the first display brightness value interval is an interval including a first display brightness value and a second display brightness value, a difference between a duty ratio of the first display brightness value and a duty ratio of the second display brightness value is less than a predetermined difference value; wherein the first display brightness value is less than second display brightness value, the second display brightness value is less than a light adjusting division display brightness value, the light adjusting division display brightness value is a display brightness division value configured to switch the DC light adjusting mode and a pulse-width modulation (PWM) light adjusting mode; and the display brightness division value corresponds to a first gamma signal, the second display brightness value corresponds to a second gamma signal, and the first display brightness value corresponds to a third gamma signal;

determining a target brightness adjusting mode according to a display brightness value interval in the display brightness value lines corresponding to an obtained target display brightness value, wherein the target brightness adjusting mode is the DC light adjusting mode or the PWM light adjusting mode; and adjusting brightness of a display device according to the target brightness adjusting mode.

Advantages

The present application provides a brightness adjusting method, a device, and a display device first obtaining display brightness value lines. A first display brightness value interval of the display brightness value lines is an interval including a first display brightness value to a second display brightness value. The first display brightness value is less than second display brightness value, and the second display brightness value is less than a light adjusting division display brightness value. Thus, the first display brightness value interval is an interval lower than the light adjusting division display brightness value. Each of the display brightness values in the first display brightness value interval lower than the light adjusting division display brightness value is set to correspond to a direct current (DC) light adjusting mode to improve linearity of the display brightness value lines in the first display brightness value interval lower than the light adjusting division display brightness value. A target brightness adjusting mode is determined according to a display brightness value interval in the display brightness value lines corresponding to an obtained target display brightness value, and then brightness of the display device is adjusted according to the target brightness adjusting mode such that an issue of a worse display effect of the display apparatus causing color bias of the display apparatus when display brightness value is less than the light adjusting division display brightness value can be mitigated.

DETAILED DESCRIPTION OF PREFERRED EMBODIMENTS

To facilitate understanding of the present application, the present application will be described more fully below with reference to the attached drawings. The preferred embodiment of the present application is given in the attached drawings. However, the present application can be implemented in many different forms without limits by the embodiments described in the specification. On the contrary, the objective of providing these embodiments is to make the disclosure of the present application more thorough.

It should be explained that when an element is considered to be "connected" to another element, it may be directly connected to and combined with another element, or there may be a co-existing centered element. The specification uses the terms "stack", "a side", "another side" and similar expressions are for the purpose of illustration only. Furthermore, the ordinal terms such as "first" and "second" mentioned in the present application do not imply any order, quantity or importance, and are only used to distinguish different parts.

Unless having otherwise definition, all technical and scientific terms used in the specification have the same meaning as commonly understood by a person of ordinary skill in the art of the present application. Terms used in the specification in the description of the present application are only to describe the objective of a specific embodiment. It is not intended to limit the present application. The term "and/or" used in the specification includes any one and all of combinations of one or a plurality of related listed objectives.

An active matrix organic light emitting diode (AMOLED) has many advantages such as high contrast, super lightness and compactness, foldability, and is a research hotspot in the display field in recent years. In recent years, an display effect of the AMOLED display develops drastically, and high refresh rate, low blue light, 10 bit color, high gamut become common.

Figure 1:
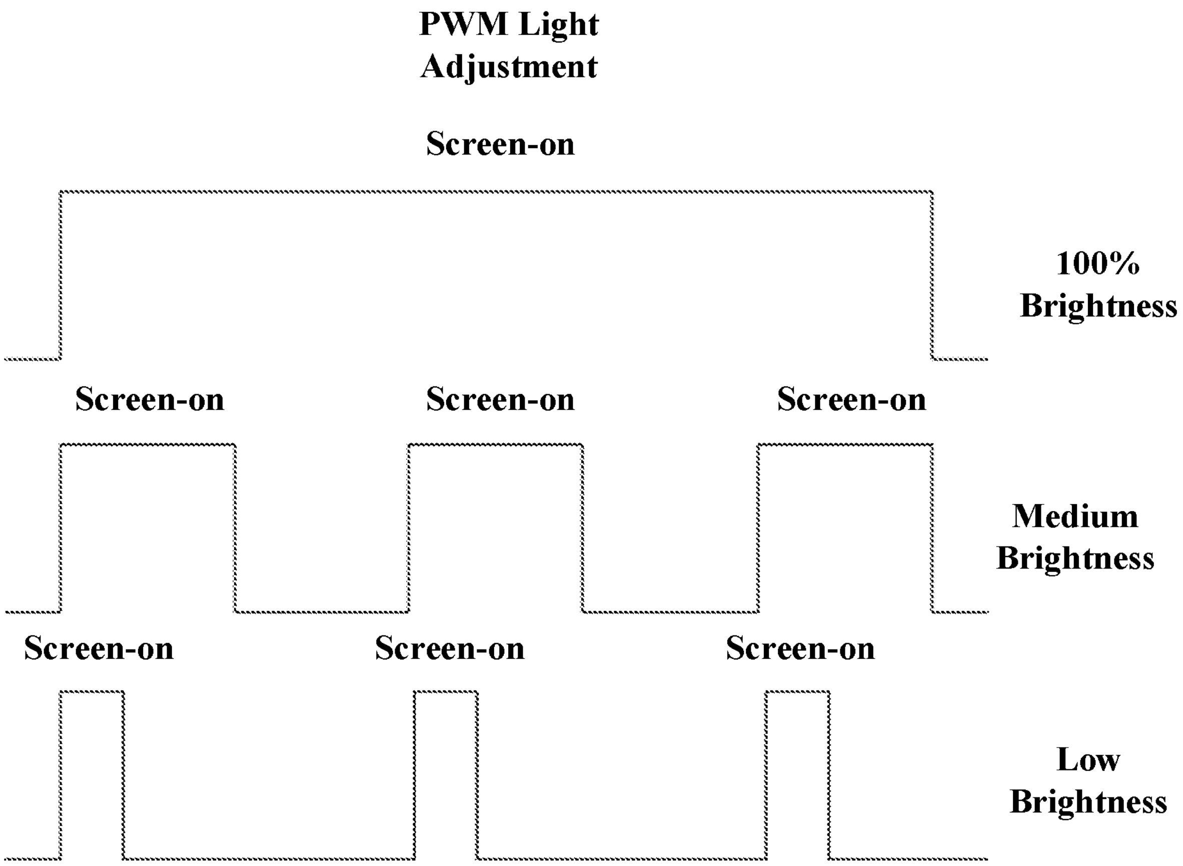
FIG. 1 is a schematic view of principles of a conventional pulse-width modulation (PWM) light adjusting method.

A conventional liquid crystal display (LCD) adjusts brightness of a backlight by changing a current of the backlight, namely, direct current light adjustment, which is also called DC light adjustment. Each pixel of an organic LED (OLED) display panel is self-luminous, and display of each image requires simultaneously controlling a light emitting intensity of ten million of pixels. Each pixel is controlled by a larger number of thin film transistor (TFT) device. Such DC light adjusting method has better color uniformity of a screen under high brightness. However, under low brightness, a pixel of OLED driven by a small current highlights difference between TFTs of the same uniformity under a process, which results in a poor display effect and causes an issue of uneven brightness and uneven chroma. For solving the issue, the conventional OLED screen employs a method of DC light adjustment under high brightness and PWM light adjustment under low brightness. Such PWM light adjusting method has principles as shown in FIG. 1, which uses persistence of vision of human's eyes to control screen brightness by an alternate darkness-and-brightness method of "screen-on, screen-off, screen-on, screen-off".

Figure 2:
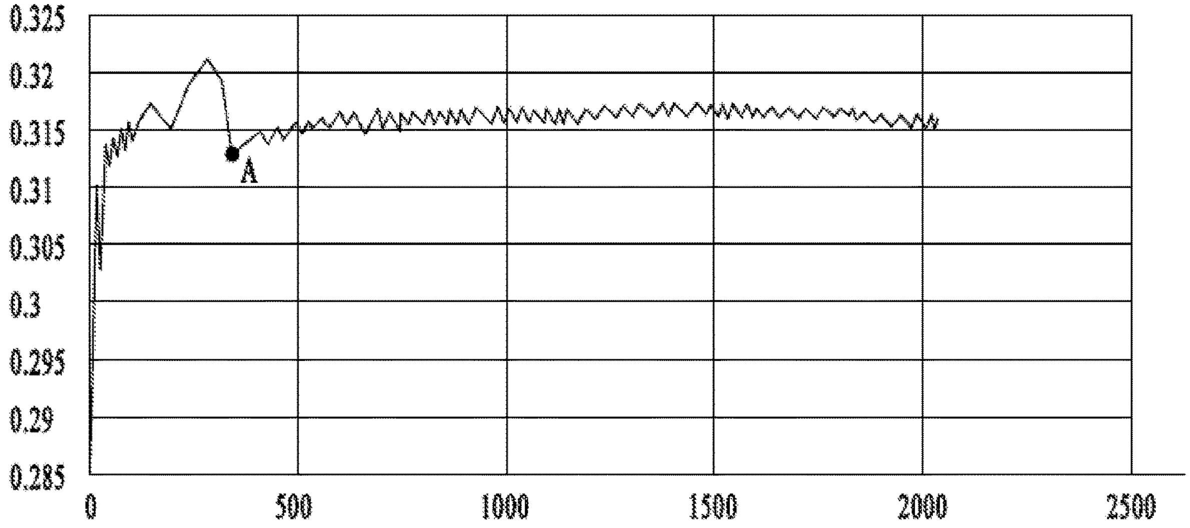
FIG. 2 is a schematic chart of display brightness value lines of switching between the conventional PWM light adjustment and DC light adjustment.

At present, a conventional switching method between pulse-width modulation (PWM) light adjusting and direct current (DC) light adjusting is as shown in FIG. 2. An abscissa of FIG. 2 is a display brightness value (DBV, and an ordinate of FIG. 2 is a chroma value. A line in FIG. 2 is a DBV line (display brightness value lines). A point A in FIG. 2 is a light adjusting division display brightness value (an abscissa of the point A shows DBV=327), values greater than the light adjusting division display brightness value is in a DC light adjusting region. Values below the light adjusting division display brightness value is in the PWM light adjusting mode. Namely, the light adjusting division display brightness value is the display brightness value (the light adjusting division display brightness value in FIG. 2 is 327) switching from the DC light adjusting mode to the PWM light adjusting mode. In FIG. 2, display linearity of the brightness lines on a left side of the point A is worse. (the display brightness line on the left side of the point A in FIG. 2 has a greater peak, and a chroma value at a tip of the peak exceeds 0.32 and reaches about 0.322). Therefore, a display effect of the display screen in the region is worse and the display screen has an issue of color bias.

Figure 3:
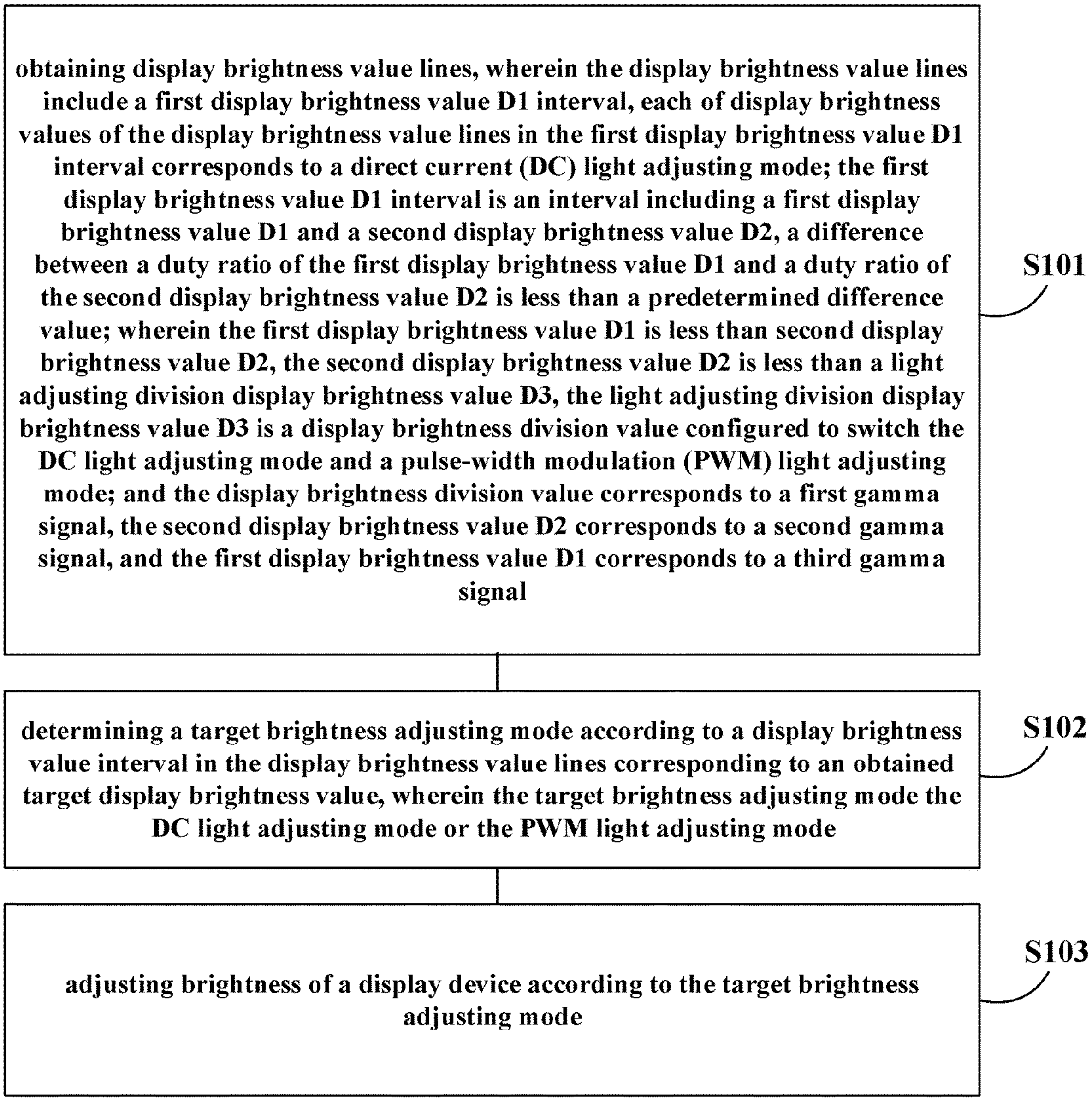
FIG. 3 is a flowchart of a brightness adjusting method provided by the embodiment of the present application.

To solve the above issue, the embodiment of the present application provides a brightness adjusting method, a device, and a display device, which will be described in combination with the attached drawings. For example, with reference to FIG. 3, FIG. 3 is a flowchart of a brightness adjusting method provided by the embodiment of the present application. The brightness adjusting method includes:

a step S101 including obtaining display brightness value lines, wherein the display brightness value lines include a first display brightness value D1 interval, each of display brightness values of the display brightness value lines in the first display brightness value D1 interval corresponds to a direct current (DC) light adjusting mode; the first display brightness value D1 interval is an interval including a first display brightness value D1 and a second display brightness value D2, a difference between a duty ratio of the first display brightness value D1 and a duty ratio of the second display brightness value D2 is less than a predetermined difference value; wherein the first display brightness value D1 is less than second display brightness value D2, the second display brightness value D2 is less than a light adjusting division display brightness value D3, the light adjusting division display brightness value D3 is a display brightness division value configured to switch the DC light adjusting mode and a pulse-width modulation (PWM) light adjusting mode; and the display brightness division value corresponds to a first gamma signal, the second display brightness value D2 corresponds to a second gamma signal, and the first display brightness value D1 corresponds to a third gamma signal;

a step S102 including determining a target brightness adjusting mode according to a display brightness value interval in the display brightness value lines corresponding to an obtained target display brightness value, wherein the target brightness adjusting mode the DC light adjusting mode or the PWM light adjusting mode; and a step S103 including adjusting brightness of a display device according to the target brightness adjusting mode.

The brightness adjusting method provided by the embodiment of the present application first obtains display brightness value lines. The first display brightness value interval of the display brightness value lines is an interval including the first display brightness value D1 to the second display brightness value D2. The first display brightness value D1 is less than the second display brightness value D2. The second display brightness value D2 is less than the light adjusting division display brightness value D3. Then, the first display brightness value interval is an interval lower than the light adjusting division display brightness value D3. Furthermore, each of the display brightness values in the first display brightness value interval lower than light adjusting division display brightness value is set to correspond to the DC light adjusting mode, which improves linearity of the display brightness value lines in the first display brightness value interval lower than light adjusting division display brightness value. Then, a target brightness adjusting mode is determined according to a display brightness value interval in the display brightness value lines corresponding to an obtained target display brightness value, and then finally, brightness of the display device is adjusted according to the target brightness adjusting mode, which can mitigate an issue of the display apparatus have a worse display effect and causing color bias of the display apparatus when the display brightness value is less than the light adjusting division display brightness value.

For example, the display brightness value lines further include a second display brightness value interval. Each of the display brightness values of the display brightness value lines in the second display brightness value interval corresponds to the PWM light adjusting mode. The second display brightness value interval is an interval including 0 to the first display brightness value D1.

The second display brightness value interval is an interval including 0 the first display brightness value D1, and each of the display brightness values in the second display brightness value interval is set to correspond to the PWM light adjusting mode. Then, an interval on the display brightness value lines lower than the first display brightness value still employs the PWM light adjusting mode for light adjusting, which can guarantee uniformity of the brightness of the display apparatus when the display brightness value is lower than the first display brightness value.

For example, the display brightness value lines further include a third display brightness value interval. Each of the display brightness values of the display brightness value lines in the third display brightness value interval corresponds to the PWM light adjusting mode. The third display brightness value interval is an interval including the second display brightness value D2 to the light adjusting division display brightness value D3.

For example, the display brightness value lines further include a fourth display brightness value interval. Each of the display brightness values of the display brightness value lines in the fourth display brightness value interval corresponds to the DC light adjusting mode. The fourth display brightness value interval is an interval greater than the light adjusting division display brightness value D3.

Figure 4:
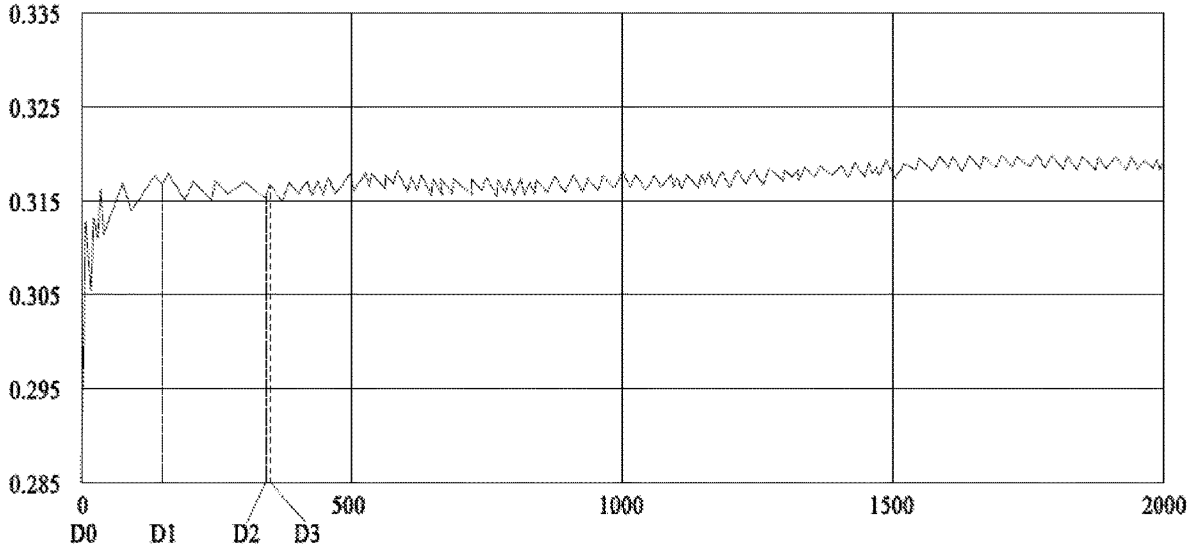
FIG. 4 is a schematic view of display brightness value lines provided by the embodiment of the present application.

For example, a difference value between the light adjusting division display brightness value D3 and the second display brightness value D2 is 1. The above brightness adjusting method is described with reference to FIG. 4 now. FIG. 4 is a schematic view of display brightness value lines provided by the embodiment of the present application. In FIG. 4, an abscissa is a display brightness value, an ordinate is a chroma value. The lines in FIG. 4 are display brightness value lines, and a target display brightness value is any one point on the display brightness value lines.

The above first display brightness value is D1 in FIG. 4. As shown in Table 1, the first display brightness value is 192, then when the target display brightness value is 192, the brightness of the display apparatus is 47 nit. Furthermore, at this time, a duty ratio of a screen-on time of the display apparatus is 59.64%. The duty ratio of the first display brightness value is the duty ratio of the screen-on time of the display apparatus when the target display brightness value is the first display brightness value.

The second display brightness value is D2 in FIG. 4. As shown in Table 1, the second display brightness value is 326. When the target display brightness value is 326, brightness of the display apparatus is 79.7 nit, and at this time, the duty ratio of the screen-on time of the display apparatus is 59.64%. When the target display brightness value is a first display brightness value, the duty ratio of the screen-on time of the display apparatus is equal to the duty ratio of the screen-on time of the display apparatus when the target display brightness value is the first display brightness value. A duty ratio of the second display brightness value is the duty ratio of the screen-on time of the display apparatus when the target display brightness value is the second display brightness value. A difference between the duty ratio of the first display brightness value and the duty ratio of the second display brightness value is less than the predetermined difference value. For example, the duty ratio of the first display brightness value in the present application is 95% to 105% of the duty ratio of the second display brightness value, and then the predetermined difference value is 5% of the duty ratio of the second display brightness value. For example, when the duty ratio of the second display brightness value is 59.64%, the predetermined difference value is 2.982%. The above first display brightness value can be any value lower than the second display brightness value as long as the difference between the duty ratio of the first display brightness value and the duty ratio of the second display brightness value is less than the predetermined difference value. repeated modulation to the display apparatus can be performed to obtain a e first display brightness value satisfying the above requirements and being lower than the second display brightness value.

The light adjusting division display brightness value is D3 in FIG. 4. As shown in Table 1, the light adjusting division display brightness value is 327. When the target display brightness value is 327, the brightness of the display apparatus is 80 nit. Furthermore, at this time, the duty ratio of the screen-on time of the display apparatus is 98.04%. A difference value between the light adjusting division display brightness value D3 and the second display brightness value D2 is 1. The display brightness division value corresponds to a first gamma signal, which means that a gamma signal inputted in the display apparatus is the first gamma signal (Gamma BAND1) when the display brightness value of the display apparatus is the display brightness division value. The second display brightness value corresponds to a second gamma signal, which means that a gamma signal inputted in the display apparatus is the second gamma signal (Gamma BAND2) when the display brightness value of the display apparatus is the second display brightness value. The first display brightness value corresponds to a third gamma signal, which means that a gamma signal inputted in the display apparatus is the third gamma signal (Gamma BAND3) when the display brightness value of the display apparatus is the first display brightness value. Then, in the above step S102, the target brightness adjusting mode is determined according to a display brightness value interval in the display brightness value lines corresponding to an obtained target display brightness value. For example, when the target display brightness value is 202, the target display brightness value belongs to the first display brightness value interval, and the target brightness adjusting mode can be determined as the DC light adjusting mode.

With reference to FIG. 4, the above the first display brightness value D1, the second display brightness value D2, and the light adjusting division display brightness value D3 divide the display brightness value lines into four regions. The four regions are a second display brightness value interval, a first display brightness value interval, a third display brightness value interval, and a fourth display brightness value interval. The second display brightness value interval is an interval from 0 to D1 in FIG. 4. The first display brightness value interval is an interval from D1 to D2 in FIG. 4. The third display brightness value interval is an interval from D2 to D3 in FIG. 4. The fourth display brightness value interval is an interval greater than D3 in FIG. 4. Target display brightness values in the second display brightness value interval and the third display brightness value interval employ the PWM light adjusting mode light adjustment. Target display brightness values in the first display brightness value interval and the fourth display brightness value interval employ the DC light adjusting mode light adjustment.

It can be seen that the present application changes the first display brightness value interval lower than light adjusting division display brightness value from the original PWM light adjusting mode to the DC light adjusting mode and uses the DC light adjusting mode to improve linearity of the display brightness value lines in the first display brightness value interval. Furthermore, it can also be seen from comparison of FIG. 2 with FIG. 4, linearity of the display brightness value lines in the first display brightness value interval in FIG. 4 is better (fluctuation of the display brightness line on a left side of the display brightness division value in FIG. 4 is more moderate, and a chroma value corresponding to each of the display brightness values in FIG. 4 does not exceed 0.32). Therefore, the issue of worse display effect of the display apparatus causing color bias of the display apparatus when the display brightness value is less than the light adjusting division display brightness value is mitigated.

The difference value between the light adjusting division display brightness value D3 and the second display brightness value D2 is set as 1, and the third interval only includes one display brightness value unit, which indicates that the third interval only achieves light adjustment of the PWM light adjusting mode in one display brightness value. The third interval only including one display brightness value unit also makes the first interval extremely near the light adjusting division display brightness value D3 such that the brightness adjusting method of the present application better solves the issue of worse linearity of the display brightness value lines around the light adjusting division display brightness value (with reference to FIG. 2, the linearity issue of the display brightness value lines around light adjusting division display brightness value and below the light adjusting division display brightness value is the most serious).

TABLE 1

| Gamma signal | display brightness value lines abscissa | brightness (nit) | display brightness value | duty ratio (EM_Duty) |
|---|---|---|---|---|
| Gamma BAND1 | D3 | 80 | 327 | 98.04% |
| Gamma BAND2 | D2 | 79.7 | 326 | 59.64% |
| Gamma BAND3 | D1 | 47 | 192 | 59.64% |

For example, the display brightness value lines are configured to indicate a correspondence relationship of the display brightness values and chroma of the display device.

Figure 5:
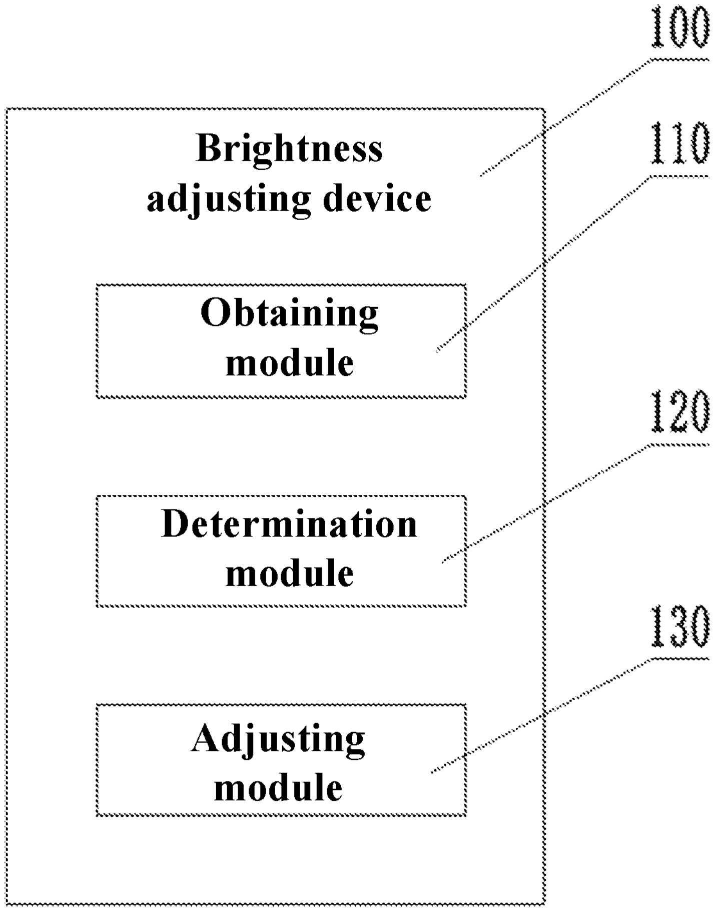
FIG. 5 is a schematic structural view of a brightness adjusting device provided by the embodiment of the present application.

In another aspect, the embodiment of the present application further provides a brightness adjusting device 100. With reference to FIG. 5, the brightness adjusting device 100 includes:

an obtaining module 110 configured to obtain display brightness value lines, wherein the display brightness value lines includes a first display brightness value interval, the display brightness value lines in the first display brightness value interval each of the display brightness values corresponds to a direct current (DC) light adjusting mode; the first display brightness value interval is an interval including the first display brightness value D1 to the second display brightness value D2, a difference between the duty ratio of the first display brightness value D1 and the duty ratio of the second display brightness value D2 is less than a predetermined difference value; wherein the first display brightness value D1 is less than the second display brightness value D2, the second display brightness value D2 is less than the light adjusting division display brightness value D3, the light adjusting division display brightness value D3 is a display brightness division value configured to switch the DC light adjusting mode and the PWM light adjusting mode, the display brightness division value corresponds to a first gamma signal, the second display brightness value corresponds to a second gamma signal, and the first display brightness value corresponds to a third gamma signal;

a determination module 120 configured to determine a target brightness adjusting mode according to a display brightness value interval in the display brightness value lines corresponding to an obtained target display brightness value, wherein the target brightness adjusting mode is a DC light adjusting mode or a PWM light adjusting mode; and an adjusting module 130 configured to adjust brightness of the display device according to the target brightness adjusting mode.

The obtaining module of the brightness adjusting device provided by the embodiment of the present application obtains display brightness value lines. The first display brightness value interval of the display brightness value lines is an interval including the first display brightness value D1 to the second display brightness value D2. The first display brightness value D1 is less than the second display brightness value D2. The second display brightness value D2 is less than the light adjusting division display brightness value D3. Then, the first display brightness value interval is an interval lower than the light adjusting division display brightness value D3. Furthermore, each of the display brightness values in the first display brightness value interval lower than light adjusting division display brightness value is set to correspond to the DC light adjusting mode, which improves linearity of the display brightness value lines in the first display brightness value interval lower than light adjusting division display brightness value. Then, the determination module further determines a target brightness adjusting mode according to a display brightness value interval in the display brightness value lines corresponding to an obtained target display brightness value. Finally, the adjusting module further adjusts brightness of the display device according to the target brightness adjusting mode, which can mitigate an issue of the display apparatus have a worse display effect and causing color bias of the display apparatus when the display brightness value is less than the light adjusting division display brightness value.

For example, the display brightness value lines further include a second display brightness value interval. Each of the display brightness values of the display brightness value lines in the second display brightness value interval corresponds to the PWM light adjusting mode. The second display brightness value interval is an interval including 0 to the first display brightness value D1.

The second display brightness value interval is an interval including 0 the first display brightness value D1, and each of the display brightness values in the second display brightness value interval is set to correspond to the PWM light adjusting mode. Then, an interval on the display brightness value lines lower than the first display brightness value still employs the PWM light adjusting mode for light adjusting, which can guarantee uniformity of the brightness of the display apparatus when the display brightness value is lower than the first display brightness value.

For example, the display brightness value lines further include a third display brightness value interval. Each of the display brightness values of the display brightness value lines in the third display brightness value interval corresponds to the PWM light adjusting mode. The third display brightness value interval is an interval including the second display brightness value D2 to the light adjusting division display brightness value D3.

For example, the display brightness value lines further include a fourth display brightness value interval. Each of the display brightness values of the display brightness value lines in the fourth display brightness value interval corresponds to the DC light adjusting mode. The fourth display brightness value interval is an interval greater than the light adjusting division display brightness value D3.

For example, a difference value between the light adjusting division display brightness value D3 and the second display brightness value D2 is 1. The above brightness adjusting method is described with reference to FIG. 4 now. FIG. 4 is a schematic view of display brightness value lines provided by the embodiment of the present application. In FIG. 4, an abscissa is a display brightness value, an ordinate is a chroma value. The lines in FIG. 4 are display brightness value lines, and a target display brightness value is any one point on the display brightness value lines.

The above first display brightness value is D1 in FIG. 4, and the first display brightness value is 192, then when the target display brightness value is 192, the brightness of the display apparatus is 47 nit. Furthermore, at this time, a duty ratio of a screen-on time of the display apparatus is 59.64%. The duty ratio of the first display brightness value is the duty ratio of the screen-on time of the display apparatus when the target display brightness value is the first display brightness value.

The second display brightness value is D2 in FIG. 4, and the second display brightness value is 326. When the target display brightness value is 326, brightness of the display apparatus is 79.7 nit, and at this time, the duty ratio of the screen-on time of the display apparatus is 59.64%. When the target display brightness value is a first display brightness value, the duty ratio of the screen-on time of the display apparatus is equal to the duty ratio of the screen-on time of the display apparatus when the target display brightness value is the first display brightness value. A duty ratio of the second display brightness value is the duty ratio of the screen-on time of the display apparatus when the target display brightness value is the second display brightness value. A difference between the duty ratio of the first display brightness value and the duty ratio of the second display brightness value is less than the predetermined difference value. For example, the duty ratio of the first display brightness value in the present application is 95% to 105% of the duty ratio of the second display brightness value, and then the predetermined difference value is 5% of the duty ratio of the second display brightness value. For example, when the duty ratio of the second display brightness value is 59.64%, the predetermined difference value is 2.982%.

The light adjusting division display brightness value is D3 in FIG. 4, and the light adjusting division display brightness value is 327. When the target display brightness value is 327, the brightness of the display apparatus is 80 nit. Furthermore, at this time, the duty ratio of the screen-on time of the display apparatus is 98.04%. A difference value between the light adjusting division display brightness value D3 and the second display brightness value D2 is 1.

With reference to FIG. 4, the above the first display brightness value D1, the second display brightness value D2, and the light adjusting division display brightness value D3 divide the display brightness value lines into four regions. The four regions are a second display brightness value interval, a first display brightness value interval, a third display brightness value interval, and a fourth display brightness value interval. The second display brightness value interval is an interval from 0 to D1 in FIG. 4. The first display brightness value interval is an interval from D1 to D2 in FIG. 4. The third display brightness value interval is an interval from D2 to D3 in FIG. 4. The fourth display brightness value interval is an interval greater than D3 in FIG. 4. Target display brightness values in the second display brightness value interval and the third display brightness value interval employ the PWM light adjusting mode light adjustment. Target display brightness values in the first display brightness value interval and the fourth display brightness value interval employ the DC light adjusting mode light adjustment.

It can be seen that the present application changes the first display brightness value interval lower than light adjusting division display brightness value from the original PWM light adjusting mode to the DC light adjusting mode and uses the DC light adjusting mode to improve linearity of the display brightness value lines in the first display brightness value interval. Furthermore, it can also be seen from comparison of FIG. 2 with FIG. 4, linearity of the display brightness value lines in the first display brightness value interval in FIG. 4 is better. Therefore, the issue of worse display effect of the display apparatus causing color bias of the display apparatus when the display brightness value is less than the light adjusting division display brightness value is mitigated.

The difference value between the light adjusting division display brightness value D3 and the second display brightness value D2 is set as 1, and the third interval only includes one display brightness value unit, which indicates that the third interval only achieves light adjustment of the PWM light adjusting mode in one display brightness value. The third interval only including one display brightness value unit also makes the first interval extremely near the light adjusting division display brightness value D3 such that the brightness adjusting device of the present application better solves the issue of worse linearity of the display brightness value lines around the light adjusting division display brightness value (with reference to FIG. 2, the linearity issue of the display brightness value lines around light adjusting division display brightness value and below the light adjusting division display brightness value is the most serious).

For example, the display brightness value lines are configured to indicate a correspondence relationship between the display brightness values and chroma of the display device.

The present invention also provides a display device, the display device includes a control unit and a storage unit. The control unit is configured to implement instructions in the storage unit to implement the brightness adjusting method as described above.

The present invention also provides a storage medium. The storage medium stores instructions, and the instructions are configured to allow the control unit to implement any one of the above brightness adjusting method. It should be explained that a person of ordinary skill in the art can understand that some or all steps of each of methods of the above embodiment can be accomplished by a program instructing related hardware. The storage medium can include: read only memory (ROM), random access memory (RAM), magnetic disk, or compact disk.

As described above, the present application provides a brightness adjusting method, a device, and a display device. First, display brightness value lines are obtained. The first display brightness value interval of the display brightness value lines is an interval including the first display brightness value D1 to the second display brightness value D2. The first display brightness value D1 is less than the second display brightness value D2. The second display brightness value D2 is less than the light adjusting division display brightness value D3. Then, the first display brightness value interval is an interval lower than the light adjusting division display brightness value D3. Furthermore, each of the display brightness values in the first display brightness value interval lower than light adjusting division display brightness value is set to correspond to the DC light adjusting mode, which improves linearity of the display brightness value lines in the first display brightness value interval lower than light adjusting division display brightness value. Then, a target brightness adjusting mode is determined according to a display brightness value interval in the display brightness value lines corresponding to an obtained target display brightness value, and then finally, brightness of the display device is adjusted according to the target brightness adjusting mode, which can mitigate an issue of the display apparatus have a worse display effect and causing color bias of the display apparatus when the display brightness value is less than the light adjusting division display brightness value.

Technical features of the above embodiments can be combined randomly. To make the description concise, not all possible combinations of the technical features in the above embodiments are described. However, combinations of these technical features should be deemed as within a range of descriptions of the specification as long as no conflict exists.

The above embodiments only indicate several embodying ways of the present application, descriptions thereof are more specific and detailed but cannot be understood as a limit to claims. It should be pointed out that for a person of ordinary skill in the art, under a precondition not departing from ideas of the present application, several variants and improvements can also be made and these all belong to a protective scope of the present application. Therefore, the patent protective scope of the present application should be based on the attached claims.

What is claimed is:

1. A brightness adjusting method, comprising:

obtaining display brightness value lines, wherein the display brightness value lines comprise a first display brightness value interval, each of display brightness values of the display brightness value lines in the first display brightness value interval corresponds to a direct current (DC) light adjusting mode; the first display brightness value interval is an interval comprising a first display brightness value and a second display brightness value, a difference between a duty ratio of the first display brightness value and a duty ratio of the second display brightness value is less than a predetermined difference value; wherein the first display brightness value is less than second display brightness value, the second display brightness value is less than a light adjusting division display brightness value, the light adjusting division display brightness value is a display brightness division value configured to switch the DC light adjusting mode and a pulse-width modulation (PWM) light adjusting mode; and the display brightness division value corresponds to a first gamma signal, the second display brightness value corresponds to a second gamma signal, and the first display brightness value corresponds to a third gamma signal;

determining a target brightness adjusting mode according to a display brightness value interval in the display brightness value lines corresponding to an obtained target display brightness value, wherein the target brightness adjusting mode is the DC light adjusting mode or the PWM light adjusting mode; and adjusting brightness of a display device according to the target brightness adjusting mode;

wherein the display brightness value lines further comprise a second display brightness value interval, each of the display brightness values of the display brightness value lines in the second display brightness value interval corresponds to the PWM light adjusting mode, the second display brightness value interval is an interval comprising 0 to the first display brightness value.

2. The brightness adjusting method according to claim 1, wherein a difference value between the light adjusting division display brightness value and the second display brightness value is 1.

3. The brightness adjusting method according to claim 1, wherein the display brightness value lines further comprise a third display brightness value interval, each of the display brightness values of the display brightness value lines in the third display brightness value interval corresponds to the PWM light adjusting mode, the third display brightness value interval is an interval comprising the second display brightness value to the light adjusting division display brightness value.

4. The brightness adjusting method according to claim 3, wherein a difference value between the light adjusting division display brightness value and the second display brightness value is 1.

5. The brightness adjusting method according to claim 4, wherein the display brightness value lines are configured to indicate a correspondence relationship between the display brightness values and a chroma of the display device.

6. A display device, comprising a control unit and a storage unit, wherein the control unit is configured to implement instructions in the storage unit to implement a brightness adjusting method;

the brightness adjusting method comprises:

obtaining display brightness value lines, wherein the display brightness value lines comprise a first display brightness value interval, each of display brightness values of the display brightness value lines in the first display brightness value interval corresponds to a direct current (DC) light adjusting mode; the first display brightness value interval is an interval comprising a first display brightness value and a second display brightness value, a difference between a duty ratio of the first display brightness value and a duty ratio of the second display brightness value is less than a predetermined difference value; wherein the first display brightness value is less than second display brightness value, the second display brightness value is less than a light adjusting division display brightness value, the light adjusting division display brightness value is a display brightness division value configured to switch the DC light adjusting mode and a pulse-width modulation (PWM) light adjusting mode; and the display brightness division value corresponds to a first gamma signal, the second display brightness value corresponds to a second gamma signal, and the first display brightness value corresponds to a third gamma signal;

determining a target brightness adjusting mode according to a display brightness value interval in the display brightness value lines corresponding to an obtained target display brightness value, wherein the target brightness adjusting mode is the DC light adjusting mode or the PWM light adjusting mode; and adjusting brightness of a display device according to the target brightness adjusting mode;

wherein the display brightness value lines further comprise a second display brightness value interval, each of the display brightness values of the display brightness value lines in the second display brightness value interval corresponds to the PWM light adjusting mode, the second display brightness value interval is an interval comprising 0 to the first display brightness value.

7. The display device according to claim 6, wherein a difference value between the light adjusting division display brightness value and the second display brightness value is 1.

8. The display device according to claim 6, wherein the display brightness value lines further comprise a third display brightness value interval, each of the display brightness values of the display brightness value lines in the third display brightness value interval corresponds to the PWM light adjusting mode, the third display brightness value interval is an interval comprising the second display brightness value to the light adjusting division display brightness value.

9. The display device according to claim 8, wherein a difference value between the light adjusting division display brightness value and the second display brightness value is 1.

10. The display device according to claim 9, wherein the display brightness value lines are configured to indicate a correspondence relationship between the display brightness values and a chroma of the display device.

11. A brightness adjusting method, comprising:

obtaining display brightness value lines, wherein the display brightness value lines comprise a first display brightness value interval, each of display brightness values of the display brightness value lines in the first display brightness value interval corresponds to a direct current (DC) light adjusting mode; the first display brightness value interval is an interval comprising a first display brightness value and a second display brightness value, a difference between a duty ratio of the first display brightness value and a duty ratio of the second display brightness value is less than a predetermined difference value; wherein the first display brightness value is less than second display brightness value, the second display brightness value is less than a light adjusting division display brightness value, the light adjusting division display brightness value is a display brightness division value configured to switch the DC light adjusting mode and a pulse-width modulation (PWM) light adjusting mode; and the display brightness division value corresponds to a first gamma signal, the second display brightness value corresponds to a second gamma signal, and the first display brightness value corresponds to a third gamma signal;

determining a target brightness adjusting mode according to a display brightness value interval in the display brightness value lines corresponding to an obtained target display brightness value, wherein the target brightness adjusting mode is the DC light adjusting mode or the PWM light adjusting mode; and adjusting brightness of a display device according to the target brightness adjusting mode;

wherein the display brightness value lines further comprise a second display brightness value interval, each of the display brightness values of the display brightness value lines in the second display brightness value interval corresponds to the PWM light adjusting mode, the second display brightness value interval is an interval comprising 0 to the first display brightness value;

wherein the display brightness value lines are configured to indicate a correspondence relationship between the display brightness values and a chroma of the display device.

12. The brightness adjusting method according to claim 11, wherein a difference value between the light adjusting division display brightness value and the second display brightness value is 1.

* * * * *